ns of a constant speed driving shaft.

United States Patent

Glover

[11] 4,073,116
[45] Feb. 14, 1978

[54] WRAPPING MACHINES
[75] Inventor: William Glover, Newcastle-upon-Tyne, England
[73] Assignee: Baker Perkins Holdings Limited, England
[21] Appl. No.: 738,281
[22] Filed: Nov. 3, 1976
[30] Foreign Application Priority Data
Nov. 12, 1975 United Kingdom ............... 46763/75
[51] Int. Cl.$^2$ .......................... B65B 9/06; B65B 51/26
[52] U.S. Cl. ................................................ 53/182 R
[58] Field of Search .................. 53/180 R, 182 R, 229
[56] References Cited
U.S. PATENT DOCUMENTS

| 2,882,662 | 4/1959  | Campbell      | 53/182   |
| 3,075,328 | 1/1963  | Willbrandt    | 53/182 X |
| 3,473,288 | 10/1969 | Nakamura et al. | 53/182 X |
| 3,546,849 | 12/1970 | Zimmerman     | 53/182 X |
| 3,633,333 | 1/1972  | Schlemmer     | 53/182   |

Primary Examiner—Robert Louis Spruill

Attorney, Agent, or Firm—Watson, Cole, Grindle & Watson

[57] ABSTRACT

A wrapping machine comprises a tube former for a forming a web of wrapping material into a tube with a longitudinal seal, a variable speed feeding mechanism for feeding the web continuously to the tube former, an infeed conveyor for feeding articles in succession into the tube former so that they become entubed in the tube of wrapping material, and crimping dies situated beyond the tube former which are operative to form transverse seals in the tube of wrapping material between the articles. The machine includes an adjustable modulating device for matching the speed of movement of the dies to substantially the speed of advance of the tube during formation of the transverse seals. An adjustable control mechanism is provided for so controlling the dies that they will form, by appropriate adjustment, transverse seals at either every revolution, during alternate revolutions only, or during every 3rd, 4th . . . or nth revolutions of a constant speed driving shaft.

6 Claims, 3 Drawing Figures

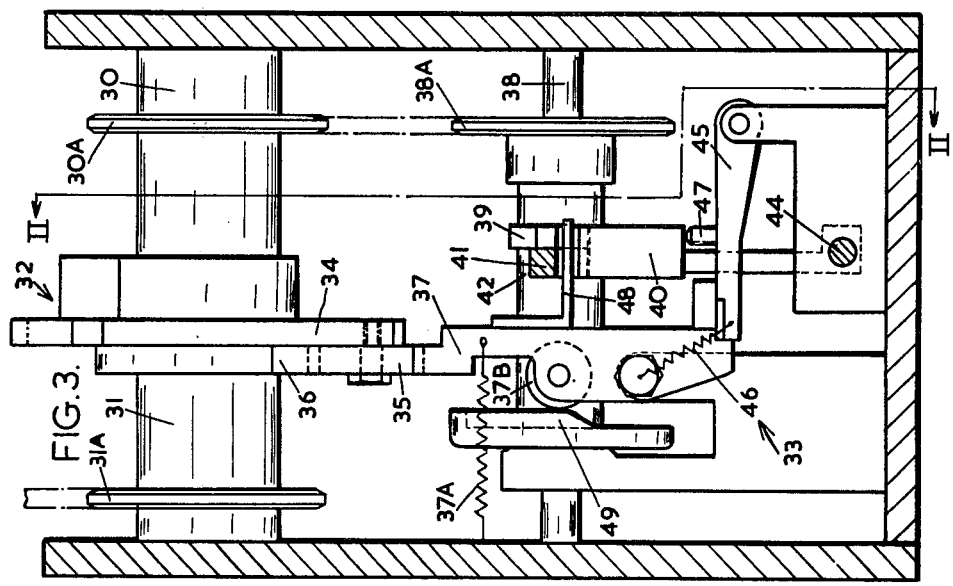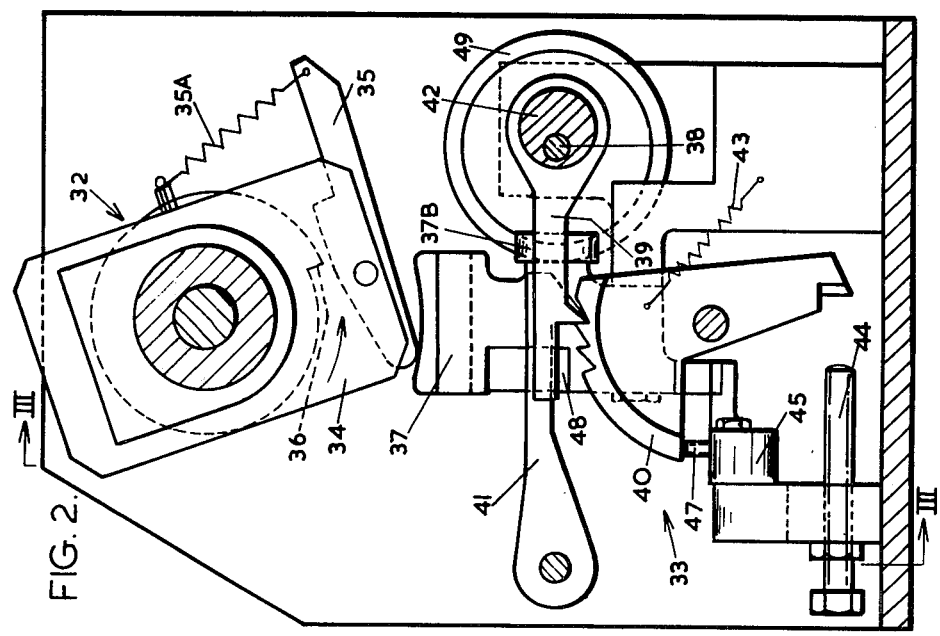

WRAPPING MACHINES

BACKGROUND OF THE INVENTION

1. Field of the Invention

This invention relates to wrapping machines of the type, hereinafter termed the type specified, comprising a tube former for forming a web of wrapping material into a tube with a longitudnal seal, a variable speed feeding mechanism for feeding the web continuously to the tube former, an infeed conveyor for feeding articles in succession into the tube former so that they become entubed in the tube of wrapping material and crimping dies situated beyond the tube former which are operative to form transverse seals in the tube or wrapping material between the articles and, if desired, also to sever it into individual packages.

2. Description of the Prior Art

In existing machines of this type, the crimping dies are normally rotary dies which rotate continuously, at uniform or variable velocity, and produce transverse seals at a regular spacing in the tube. It is, however, possible to use reciprocating dies, which periodically close on the tubes and advance with it to form a seal and then release it, or dies which perform an orbital motion. In all cases the dies of existing machines form a transverse seal in the tube at each machine cycle.

For effective formation of the transverse seals it is necessary that the speed of the crimping dies should be substantially equal to the linear speed of advance of the tube at the moment of sealing, and by this is meant that the speed of the dies must be so matched to the speed of advance of the tube that it is not substantially less than, although it may slightly exceed, the speed of advance of the tube. Rotary crimping dies in existing machines make one revolution per machine cycle, i.e., per revolution of a constant speed driving shaft, and the maximum distance between successive transverse seals, and therefore the maximum length of package which can be made by the machine, is accordingly substantially equal to the circumference of the circle swept by the rotating dies.

If the machine is to be used for wrapping articles which are shorter than the maximum length of package, it is obviously desirable to shorten the package length to avoid wastage of wrapping material. This can be achieved by adjustment of the web feeding means to feed the web more slowly and corresponding adjustment of the infeed conveyor, but provision must then be made for adjusting the peripheral speed of the rotary crimping dies, which continue to make the same number of revolutions per unit of time, during the periods while the transverse seals are being made. This can be achieved by applying to the crimping dies a speed modulating drive, which is adjustable to match the speed of the dies to that of the tube during that portion of the machine cycle at which a transverse seal is formed. Such speed modulation drives are well known and are described, for example, in British Pat. No. 1,420,471 and in U.S. Pat. Nos. 3,633,333 to Schlemmer et al., and 3,546,849 to Zimmerman.

By the provision of such a modulated drive for the rotary crimping dies, the machine can be adapted to wrap articles within a given range of length determined as to its upper limit by the aforesaid maximum package length. With a machine using continuously rotating crimping dies, it is only possible to increase the package length above this maximum by replacement of the dies by larger dies, which sweep a larger circle. This involves the complication and expense of providing a second set of dies and making provision for adjustment of the spacing between the shafts of the dies to accord with the size of die fitted. Also production time is lost during changing of the dies.

The object of the present invention is to provide a universal machine which can be adjusted to suit a much wider range in length of the articles to be wrapped without the necessity for exchange of the crimping dies.

SUMMARY OF THE INVENTION

The present invention accordingly provides a wrapping machine of the type specified which includes adjustable modulating means for matching the speed of movement of the dies substantially to the speed of advance of the tube during formation of the transverse seals and an adjustable mechanism for so controlling the dies that they will form, at will, transverse seals at every machine cycle, during alternate machine cycles only, or during every 3rd, 4th ..... or $n^{th}$ machine cycle only.

Preferably the dies are rotary dies which make one revolution at each machine cycle and are driven by an adjustable speed modulating drive. Alternatively, the dies may rotate at constant speed and matching of the speed of the dies and the speed of advance of the tube may be effected by driving the feed mechanism for the web through a speed modulating drive.

In a preferred embodiment of the invention the machine includes a normally disengaged one-revolution clutch which, when engaged, is effective to impart one revolution to the dies, and an adjustable counting mechanism for counting the machine cycles performed and operative to effect, in accordance with its setting, engagement of the clutch at every machine cycle, during alternate machine cycles only, or during every 3rd, 4th.... or nth machine cycle only.

According to the adjustment of the counting mechanism, the crimping dies can be caused to rotate during every machine cycle to suit the machine to articles of a minimum range of size, during alternate machine cycles only, remaining stationary during the other cycles, to suit the machine to articles of a longer range of size, during each third machine cycle only to suit articles of a still longer range of size and so on.

DESCRIPTION OF THE DRAWING

One embodiment of wrapping machine according to the invention is illustrated in the accompanying diagrammatic drawings, in which:

FIG. 2 is a section on the line II-II in FIG. 3 showing the counting and clutch mechanism, and FIG. 3 is a section on the line III-III in FIG. 2.

DESCRIPTION OF THE PREFERRED EMBODIMENT

Figure 1:
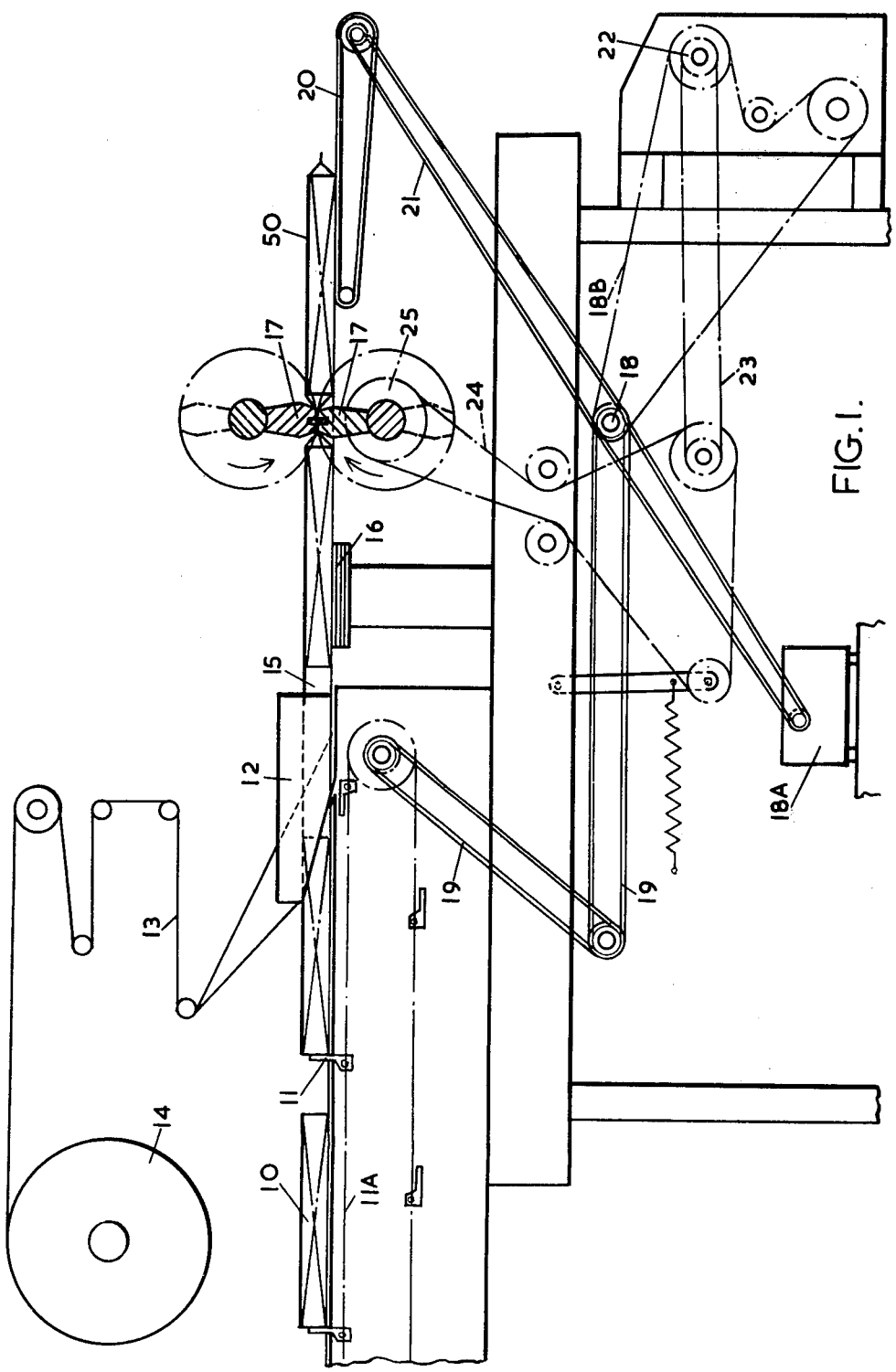
FIG. 1 is a side schematic view of the machine.

Articles 10 to be wrapped are advanced by the flights 11 of an infeed conveyor 11A to a tube former 12, to which a web 13 of heat-sealable wrapping material is fed from a reel 14. The tube former forms the web into a tube 15 surrounding the articles and having a longitudinal seal formed by sealing rollers, one of which is shown at 16, which are driven at variable speed and which also serve to feed the wrapping material through the machine. Transverse seals are formed in the tube between the articles by rotary crimping dies 17, which also include knives for severing the tube into individual packages 50.

The machine includes a main shaft 18, driven at constant speed by a motor 18A. The infeed conveyor is driven from the shaft 18 through belt drives 19. An outfeed conveyor 20 is driven from the shaft 18 through a belt drive 21.

An intermittent drive to the dies 17, which are geared together, is provided from the shaft 18, via a chain drive 18B, a counting and clutch mechanism 22, a chain drive 23 and a chain drive 24 which drives a sprocket 25. A known adjustable speed modulating drive such as that described in the noted British Pat. No. 1420471 is provided between the sprocket 25 and the lower die 17.

As shown in FIGS. 2 and 3, the counting and clutch mechanism 22 includes an input shaft 30 which is rotated continuously by the drive from the main shaft 18, an output shaft 31, carrying a sprocket 31A which drives the chain drive 23, and a one-revolution clutch 32 which is engaged during machine cycles determined by the setting of a counting mechanism 33. The input shaft 30 carries a plate 34, on which is pivoted a latch 35 which is urged by a tension spring 35A to a position in which it would engage a driving flange 36 on the output shaft 31 to impart a revolution to the crimping dies. When, however, a pivotally mounted trip plate 37 occupies the position illustrated in FIG. 2, the trip plate coacts with the latch 35, just before it can engage the flange 36, to rock it clockwise against the action of the spring 35A to prevent such engagement.

The input shaft 30 drives a cam shaft 38 through a chain and sprocket drive between sprockets 30A, 38A. A pawl 39, mounted on an eccentric 42 on the cam shaft cooperates with a pivoted counting ratchet 40 to advance it one step at each machine cycle and a retaining pawl 41 retains the ratchet in its advanced position. The ratchet 40 is advanced against the action of a spring 43 from an initial position determined by an adjustable stop 44. When the ratchet has been advanced through a number of steps, in the case illustrated three steps, determined by the adjustment of the stop 44, it depresses a trip lever 45, which is normally held raised by a spring 46 and has an upstanding nose 47 which is engaged by the ratchet 40. FIGS. 2 and 3 show the parts in the position they occupy after the pawl 39 has engaged the third tooth on the ratchet 40 and is about to advance it to depress the lever 45.

When the level 45 is in its normal raised position shown, it coacts with the lower end of the trip plate 37 to retain it in the position in which it prevents engagement of the latch 35. When, however, the lever 45 is depressed the plate 37 is rocked counter clockwise (as seen in FIG. 3) by a spring 37A to a position in which it is clear of the latch 35 and permits the spring 35A to move the latch to position to be engaged by the driving flange 36 on the clutch 32. By the time the lever 45 is lowered, a cam 49 on the cam shaft 38 has rotated to bring its low portion opposite a follower 37B to permit counter clockwise movement of the latch by the spring 37A. As the plate 37 rocks, an angle piece 48 on the plate lifts the pawls 39 and 41 to allow the spring 43 to return the ratchet 40 to its starting position in which it abuts the stop 44. Shortly afterwards the cam 49 rocks the plate 37 back to its initial position in which it is again retained by the lever 45 to prevent engagement of the clutch at the next machine cycle.

With the stop 44 adjusted as shown, the clutch 32 is engaged to drive the crimping dies at every third machine cycle. By appropriate adjustment of the stop 44, it can be arranged that a single step of movement of the ratchet from its starting position, or two steps of movement are required to release the clutch. By providing more teeth on the ratchet than the three shown, the mechanism can obviously be used to count more machine cycles before engagement of the clutch.

To set the machine for a desired length of package the following adjustments are therefore required:
1. Set the flights 11 of the infeed conveyor at the required pitch to suit the length of the articles to be wrapped.
2. Set the wrapping material feed length mechanism by adjustment of the speed of rotation of the rollers 16.
3. Set the counting and clutch mechanism to operate in the required manner by adjustment of the stop 44.
4. Set the modulating drive mechanism to obtain the desired velocity of the crimping dies when they engage the wrapping material.

EXAMPLE.

To wrap an article 45 inches long employing a machine in which the crimping dies rotate in a circumferential path of 18 inches.

For an article 45 inches long to be wrapped the machine will have to have performed at least three cycles for the article to have passed the crimping station.

Having ascertained the lowest number of cycles required, which is three in the present example, it is necessary to divide this figure into the length of the article —45/3 = 15 inches.

This figure of 15 inches is then set by adjusting the machine as per step 4. A scale is provided on the machine for different lengths of articles which ensures that the crimping jaws engage the article at the set length and at the required velocity.

The counting and clutch mechanism is also set for three revolutions as per step 3.

As a result of these actions the machine can be set in motion with the result that an article of 45 inches length passes the crimping and cutting dies which are prevented from rotating for two machine cycles by reason of the counting and clutch mechanism and then are allowed to rotate during the third cycle.

The machine according to the invention thus enables a large range of package lengths to be produced without the necessity for changing the crimping dies or adjusting the shafts on which they are mounted.

If desired the crimping dies can be arranged to perform crimping only and be followed by a pair of cutting dies also having a modulated drive and controlled by the counting and clutch mechanism. A separate counting and clutch mechanism could be provided for the cutting dies to enable, when short packages are being made, the cutting dies to sever the tube into groups of connected packages instead of individual packages.

What I claim as my invention and desire to secure by Letters Patent is:
1. A wrapping machine comprising
a tube former means for forming a web of wrapping material into a tube with a longitudinal seal;
means for continuously feeding a web of wrapping material to said tube former means;
an infeed conveyer for feeding articles in succession into said tube former means in order to be entubed in a tube of wrapping material;

a pair of opposed crimping dies positioned adjacent an outlet side of said tube former means which periodically contact the tube as it passes out of said tube former means and which then cooperate to form transverse seals in the tube of wrapping material between the succession of articles contained therein as said tube passes out of said tube former means;

a drive shaft;

means connected to said drive shaft to rotate said drive shaft at a constant speed;

means operatively connecting said drive shaft to at least one of said pair of opposed crimping dies for operation of said dies to form said transverse seals;

means for modulating the speed of movement of said pair of dies during their contact with the tube to the speed of movement of said tube out of said tube former means; and said means operativey connecting said drive shaft to at least one of said pair of opposed crimping dies including an adjustable control mechanism, said control mechanism function into to disconnect operation of said at least one die from said drive shaft based on a predetermined, selected number of rotations of said drive shaft, thereby controlling the distance between transverse seals formed in the tube passing out of said tube former means.

2. A wrapping machine according to claim 1, wherein the opposed pair of dies are rotary dies which are capable of making one revolution for each rotation of said constant speed drive shaft.

3. A wrapping machine according to claim 1, wherein, said means operatively connecting said drive shaft to at least one of said pair of opposed crimping dies includes a first drive means connected between said constant speed drive shaft and said adjustable control mechanism and a second drive means connected between said adjustable control mechanism and said at least one of said pair of opposed crimping dies; said adjustable control mechanism including a clutch means capable of interconnecting said first drive means and said second drive means, and an adjustable counting mechanism capable of engaging or disengaging said clutch in accordance with a predetermined number of rotations of said constant speed drive shaft.

4. A wrapping machine according to claim 3, wherein said adjustable control mechanism includes an input shaft which is rotated by said first drive means and coaxially displaced output shaft capable of operating said second drive means; wherein said clutch comprises a latch connected to said input shaft, a driving flange connected to said coaxial output shaft, and means biasing said latch to engage said driving flange to allow said rotating input shaft to rotate said output shaft; and wherein said adjustable counting mechanism includes a trip member which is capable of contacting said latch to disengage it from said driving flange.

5. A wrapping machine according to claim 4, wherein said adjustable control mechanism also includes an element which is connected to advance incrementally with each rotation of said input shaft, and means connected between said element and said trip member and responsive to the incremental movement of said element to control the positioning of said trip member.

6. A wrapping machine according to claim 5, wherein said element is a ratchet having teeth thereon, means connected to said ratchet to bias said ratchet in an initial position, and an adjustable stop means which determines the number of increments of movement of said ratchet before said means connected between said ratchet and said trip member operates to control the positioning of said trip member.

* * * * *